United States Patent
August et al.

(10) Patent No.: US 7,292,980 B1
(45) Date of Patent: Nov. 6, 2007

(54) GRAPHICAL USER INTERFACE AND METHOD FOR MODIFYING PRONUNCIATIONS IN TEXT-TO-SPEECH AND SPEECH RECOGNITION SYSTEMS

(75) Inventors: Katherine Grace August, Matawan, NJ (US); Michelle McNerney, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/303,057

(22) Filed: Apr. 30, 1999

(51) Int. Cl.
*G10L 15/04* (2006.01)

(52) U.S. Cl. ........................ 704/254; 704/251

(58) Field of Classification Search ............... 704/270, 704/277, 260, 251–254
See application file for complete search history.

(56) References Cited

U.S. PATENT DOCUMENTS

| | | | |
|---|---|---|---|
| 5,027,406 A * | 6/1991 | Roberts et al. .............. 704/244 |
| 5,393,236 A * | 2/1995 | Blackmer et al. ........... 434/160 |
| 5,697,789 A * | 12/1997 | Sameth et al. .............. 434/157 |
| 5,799,276 A * | 8/1998 | Komissarchik et al. ...... 704/251 |
| 5,845,238 A * | 12/1998 | Fredenburg ................... 704/1 |
| 5,850,627 A * | 12/1998 | Gould et al. ................. 704/231 |
| 5,850,629 A * | 12/1998 | Holm et al. ................. 704/260 |
| 5,933,804 A * | 8/1999 | Huang et al. ................ 704/260 |
| 5,940,797 A * | 8/1999 | Abe ............................ 704/260 |
| 5,953,692 A * | 9/1999 | Siegel ............................ 704/1 |
| 5,999,895 A * | 12/1999 | Forest ............................ 704/1 |
| 6,012,028 A * | 1/2000 | Kubota et al. ............... 704/260 |
| 6,016,471 A * | 1/2000 | Kuhn et al. .................. 704/266 |
| 6,101,468 A * | 8/2000 | Gould et al. ................. 704/251 |
| 6,178,397 B1 * | 1/2001 | Fredenburg ................... 704/1 |
| 6,185,535 B1 | 2/2001 | Hedin et al. ................. 704/270 |
| 6,226,614 B1 * | 5/2001 | Mizuno et al. .............. 704/260 |
| 6,256,630 B1 * | 7/2001 | Gilai et al. .................. 704/251 |
| 6,275,789 B1 * | 8/2001 | Moser et al. ................... 704/7 |

(Continued)

FOREIGN PATENT DOCUMENTS

EP   0 372 734   6/1990

(Continued)

OTHER PUBLICATIONS

Rambally et al, "A Text to Speech Environment: Applications in Education", IEEE, 1991, pp. 1158-1161.*

(Continued)

*Primary Examiner*—Michael N. Opsasnick (57) ABSTRACT

A method and user interface which allow users to make decisions about how to pronounce words and parts of words based on audio cues and common words with well known pronunciations. Users input or select words for which they want to set or modify pronunciations. To set the pronunciation of a given letter or letter combination in the word, the user selects the letters and is presented with a list of common words whose pronunciations, or portions thereof, are substantially identical to possible pronunciations of the selected letters. The list of sample, common words is ordered based on frequency of correlation in common usage, the most common being designated as the default sample word, and the user is first presented with a subset of the words in the list which are most likely to be selected. In addition, the present invention allows for storage in the dictionary of several different pronunciations for the same word, to allow for contextual differences and individual preferences.

23 Claims, 7 Drawing Sheets

U.S. PATENT DOCUMENTS

| | | | |
|---|---|---|---|
| 6,363,347 B1 | 3/2002 | Rozak | 704/244 |
| 6,389,394 B1* | 5/2002 | Fanty | 704/249 |
| 6,865,533 B2* | 3/2005 | Addison et al. | 704/260 |

FOREIGN PATENT DOCUMENTS

| | | |
|---|---|---|
| JP | 2224000 | 9/1990 |
| JP | 8095587 | 4/1996 |
| JP | 8320864 | 12/1996 |
| JP | 5204389 | 8/1998 |
| JP | 10336354 | 12/1998 |
| JP | 200251154 T | 4/2002 |
| WO | WO 98 45834 A | 10/1998 |

OTHER PUBLICATIONS

Urbanczyk et al, "Assignment of Syllable Stress in a Demisyllable based TTS Synthesis System", 1989, IEEE, pp. 467-470.*

Adamson et al, "A Recurrent Network that Learns to Pronounce English Text", IEEE, pp. 1704-1707.*

European Search Report for Application No. EP 00 30 3371, dated Sep. 3, 2003.

Document entitled, "XP-002071076 Dragon Speech Tool 1.0 Builds Custom Speaker-Independent Vocabularies for Speech Recognition"—Dragon Developer Series, 1996. URL:www.dragonsys.com.

* cited by examiner

GRAPHICAL USER INTERFACE AND METHOD FOR MODIFYING PRONUNCIATIONS IN TEXT-TO-SPEECH AND SPEECH RECOGNITION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to user interfaces and, in particular, to graphical user interfaces for use with text-to-speech and automated speech recognition systems.

Voice or speech recognition and generation technology is gaining in importance as an alternative or supplement to other, conventional input and output devices. This will be particularly true with continued improvements and advances in the underlying software methodologies employed and in the hardware components which support the processing and storage requirements. As these technologies become more generally available to and used by the mass market, improvements are needed in the techniques employed in initializing and modifying speech recognition and generation systems.

A few products exist which allow users to process files of text to be read aloud by synthesized or recorded speech technologies. In addition, there are software products used to process spoken language as input, identify words and commands, and trigger an action or event. Some existing products allow users to add words to a dictionary, make modifications to word pronunciations in the dictionary, or modify the sounds created by a text-to-speech engine.

However, users of these products are required to understand and employ specialized information about grammar, pronunciation, and linguistic rules of each language in which word files are to be created. Moreover, in some of these products the means of representing pronunciations requires mastery of a mark-up language with unique pronunciation keys not generally used in other areas.

As a result, these products make text-to-speech and automated speech recognition technology inflexible and less accessible to the general public. They require users to become experts in both linguistic rules and programming techniques. The inflexibility arises in part because these products use general rules of the language in question to determine pronunciation without regard to context, such as geographic context in the form of dialects, or individual preferences regarding the pronunciation of certain words such as names.

Further, the existing products generally provide less than satisfactory results in pronunciations or translations of pronunciations. The products do not perform well with respect to many types of words including acronyms, proper names, technological terms, trademarks, or words taken from other languages. Nor do these products perform particularly well in accounting for variations in pronunciations of words depending on their location in a phrase or sentence (e.g., the word "address" is pronounced differently when used as a noun as opposed to a verb).

As a result, there is a need for a user interface method and system which expresses pronunciation rules and options in a simple way so that nonexpert users can take fuller advantage of the benefits of text-to-speech and speech recognition technologies.

SUMMARY OF THE INVENTION

It is an object of the present invention to solve the problems described above with existing text-to-speech and speech recognition systems.

It is another object of the present invention to provide a simple and intuitive user interface for setting and modifying pronunciations of words.

It is another object of the present invention to provide for the use in text-to-speech and speech recognition systems of sounds or letter groups which are not typically used in or even violate the rules of a language.

These and other objects of the invention are achieved by a method and user interface which allows users to make decisions about how to pronounce words and parts of words based on audio cues and common words with well known pronunciations.

Thus, in some embodiments, users input or select words for which they want to set or modify pronunciations. To set the pronunciation of a given letter or letter combination in the word, the user selects the letter(s) and is presented with a list of common words whose pronunciations, or portions thereof, are substantially identical to possible pronunciations of the selected letters. Preferably the list of sample, common words is ordered based on frequency of correlation in common usage, the most common being designated as the default sample word, and the user is first presented with a subset of the words in the list which are most likely to be selected.

In addition, embodiments of the present invention allow for storage in the dictionary of several different pronunciations for the same word, to allow for contextual differences and individual preferences.

Further embodiments provide for the storage of multiple dictionaries for different languages, but allow users to select pronunciations from various dictionaries to account for special words, parts of words, and translations. As a result, users may create and store words having any sound available to the system, even when the sound doesn't generally correspond with letters or letter groups according to the rules of the language.

In addition to modifying pronunciations of letters in a word, embodiments of the present invention allow users to easily break words into syllables or syllable-like letter groupings or word subcomponents even when the rules of a given language do not provide for such groupings as syllables, and to specify which such syllables should be accented. As used herein, the word syllable refers to such traditional syllables as well as other groupings.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Embodiments of the present invention are now described in detail with reference to the drawings in the figures.

Figure 1:
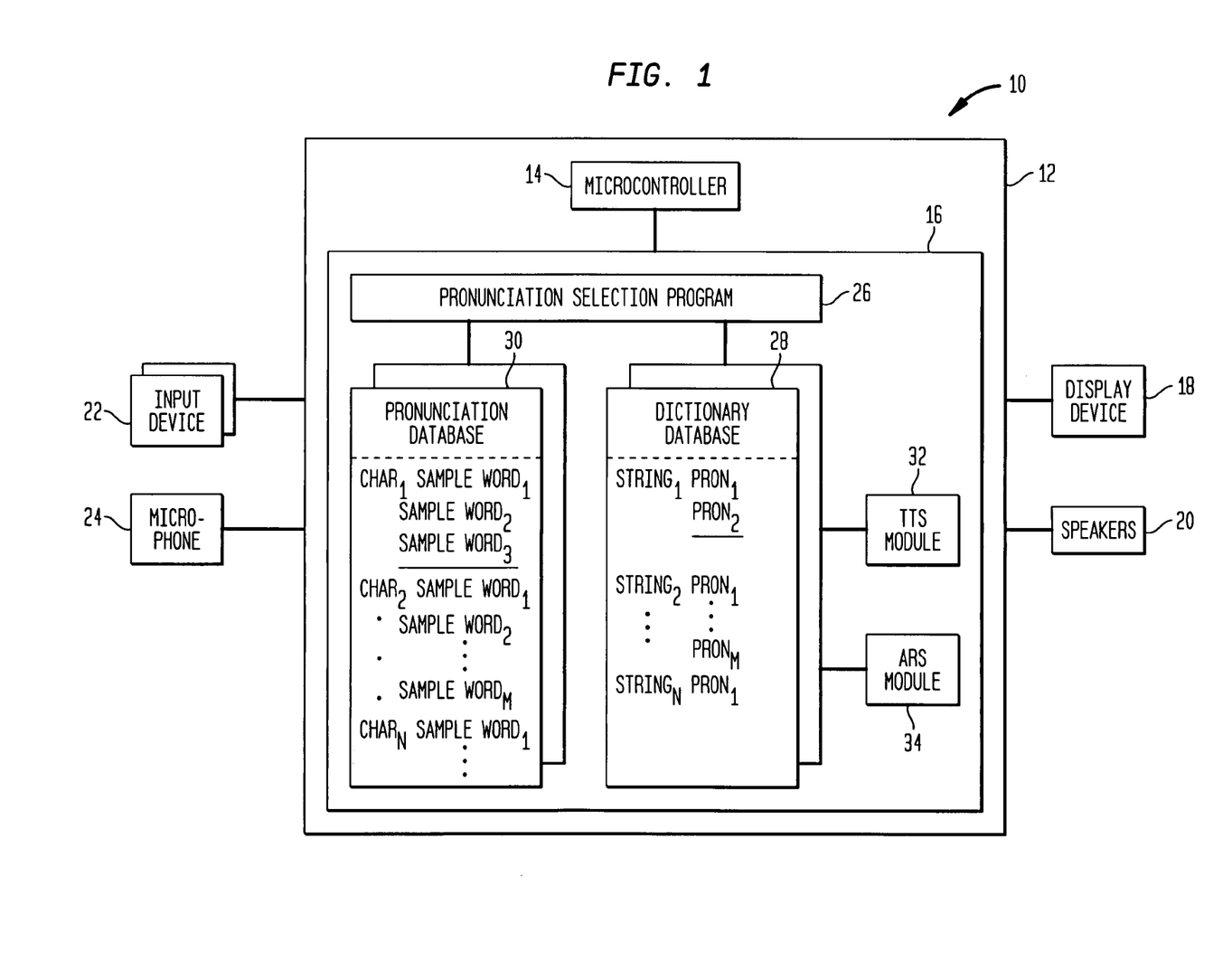
FIG. 1 is a block diagram of a system in accordance with embodiments of the present invention.

A text to speech ("TTS") and automated speech recognition ("ASR") system 10 is shown in FIG. 1. The system 10 contains a computerized apparatus or system 12 having a microcontroller or microprocessor 14 and one or more memory devices 16. The system 10 further has one or more display devices 18, speakers 20, one or more input devices 22 and a microphone 24. All such components are conventional and known to those of skill in the art and need not be further described here.

Memory device or devices 16, which may be incorporated in computer apparatus 12 as shown or may be remotely located from computer 12 and accessible over a network or other connection, store several programs and data files in accordance with the present invention. A pronunciation selection program 26 allows, when executed on microcontroller 14 for the generation of the user interface described herein, the processing of a user's input and the retrieval of data from databases 28 and 30. Dictionary databases 28 are a number of databases or data files, one for each language handled by the system 10, which store character strings and one or more pronunciations associated therewith. Pronunciation databases 30 are a number of databases or data files, one for each of the languages, containing records each having a character or character group and a number of sample words associated therewith which contain characters that are pronounced in a manner which is substantially identical to the way the characters may be pronounced. The sample words are selected in creating the pronunciation databases 30 based on grammatical and linguistic rules for the language. Preferably, the sample words for each character or character group (e.g., dipthong) are ordered generally from more common usage in pronunciation of the character to less common.

Although shown as two databases, the dictionary database 28 and pronunciation database 30 may be structured as one data file or in any other format which facilitates retrieval of the pronunciation data as described herein and/or which is required to meet the needs of a given application or usage.

The system 10 further contains a TTS module 32 and ASR module 34 stored in memory 16. These modules are conventional and known to those of skill in the art and include, for example, the ViaVoice® software program available from IBM. These modules 32 and 34 convert text stored as digital data to audio signals for output by the speakers 20 and convert audio signals received through microphone 24 into digital data. The modules retrieve and utilize pronunciation data stored in the dictionary databases 28.

Figure 2:
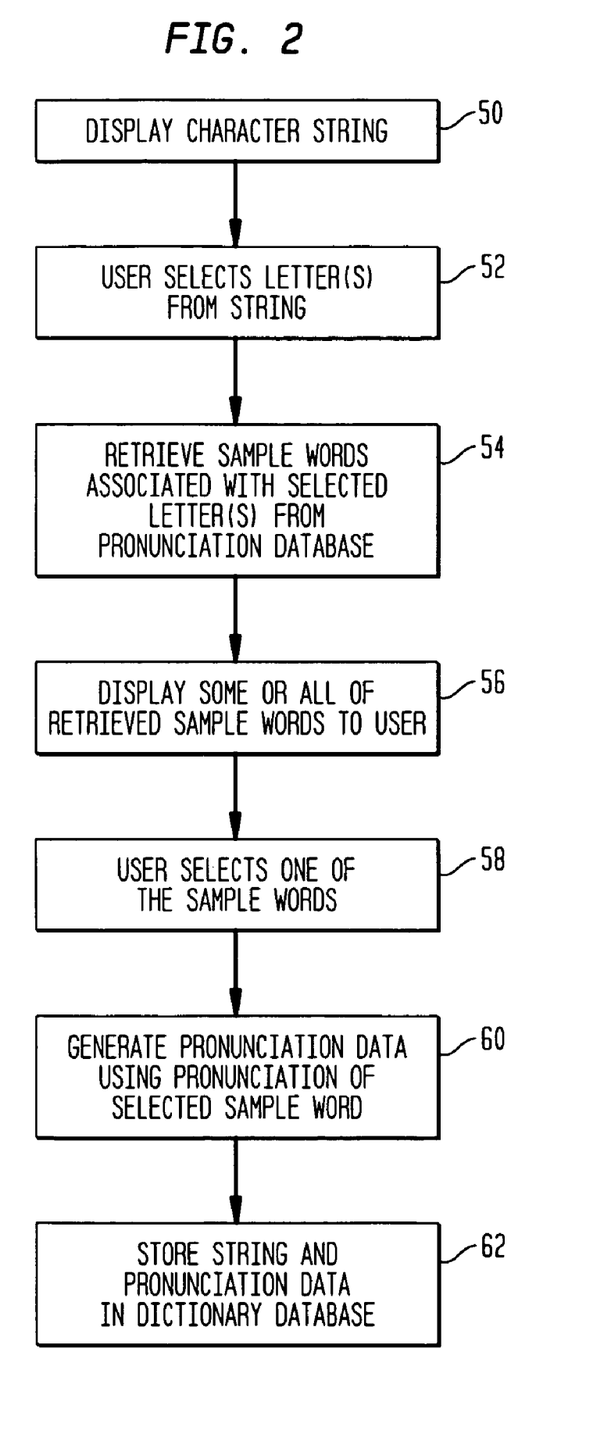
FIG. 2 is a flow chart showing broadly a process of allowing users to modify word pronunciations in accordance with the present invention using the system of FIG. 1.
Figure 3A:
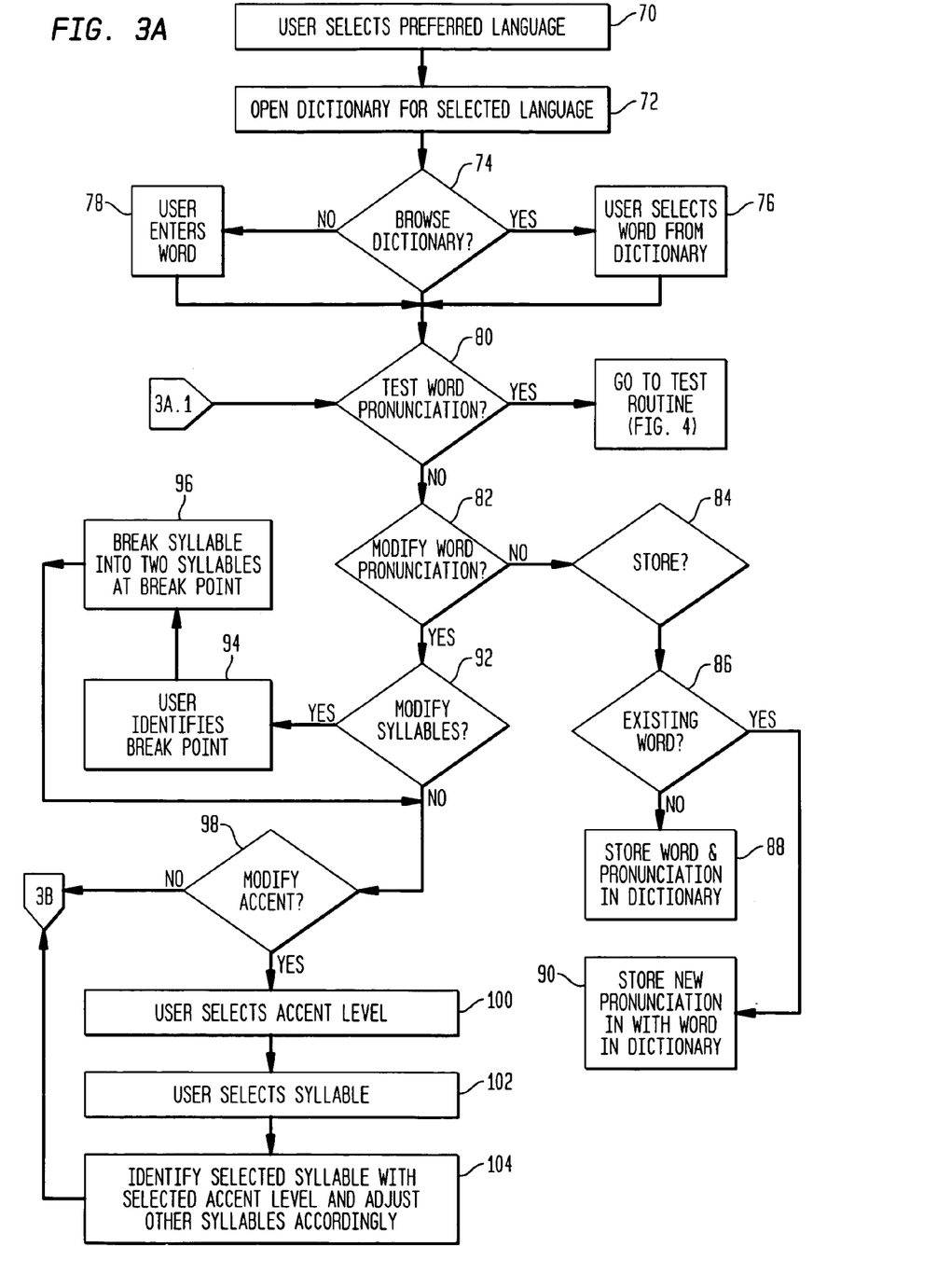
FIGS. 3A-3B contain a flow chart showing in greater detail the process of allowing users to modify word pronunciations in accordance with an embodiment of the present invention.
Figure 3B:
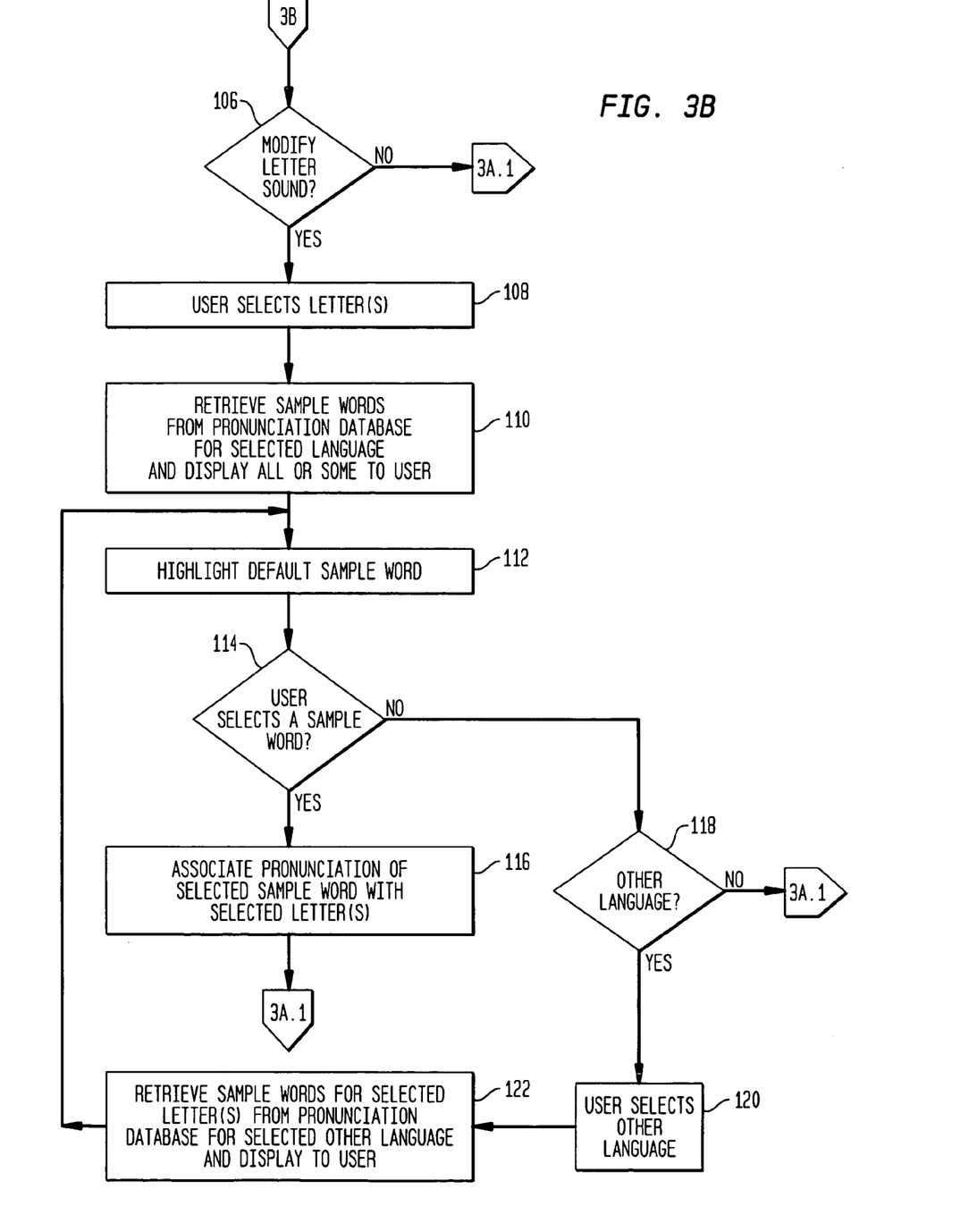

A method for allowing users to easily modify the pronunciation data stored in dictionary databases 28, as performed by pronunciation selection program 26, is described generally in FIG. 2 and in greater detail in FIGS. 3A-3B. Referring to FIG. 2, in accordance with the invention a character string, which may be a word, name, etc., is displayed on display device 18, step 50. A user uses input devices 22 to select one or more letters from the string, step 52. As is understood, pronunciation variations may be linked to individual letters such as vowels or to groups of letters such as "ou", "ch", "th" or "gh". The program 26 queries pronunciation database 30 to retrieve the sample words associated with the selected letter or letter group, step 54. If the letter or letter group is absent from the pronunciation database 30, an error message may be sent or sample words for one of the letters may be retrieved. Some or all of the sample words are displayed, step 56, and the user selects one of the words, step 58. The program 26 then generates pronunciation data for the character string using the sample word to provide a pronunciation of the selected letter(s), step 60. The string and pronunciation data are stored in the dictionary database 28, step 62, and the string may be audibly output by the output of the TTS module 32 or used to create a speaker verification or utterance for ASR module 34.

Figure 5:
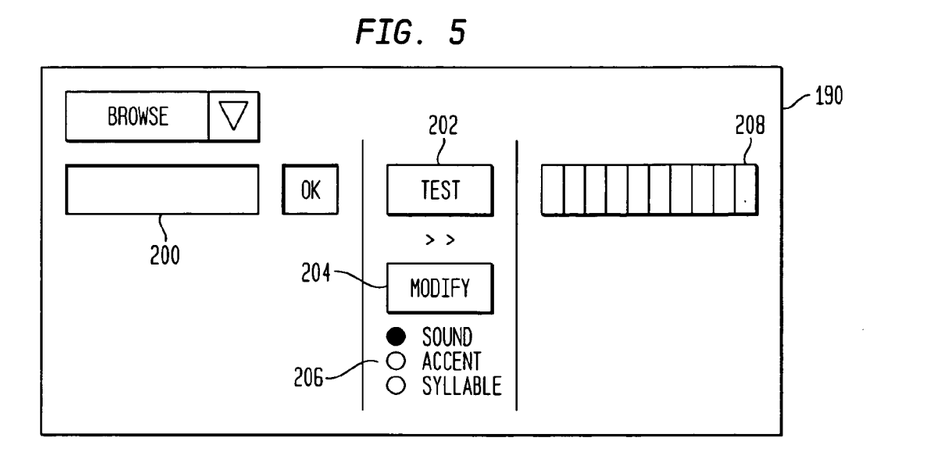
FIGS. 5-9 contain diagrams of screen displays showing the graphical user interface of one embodiment of the present invention.
Figure 6:
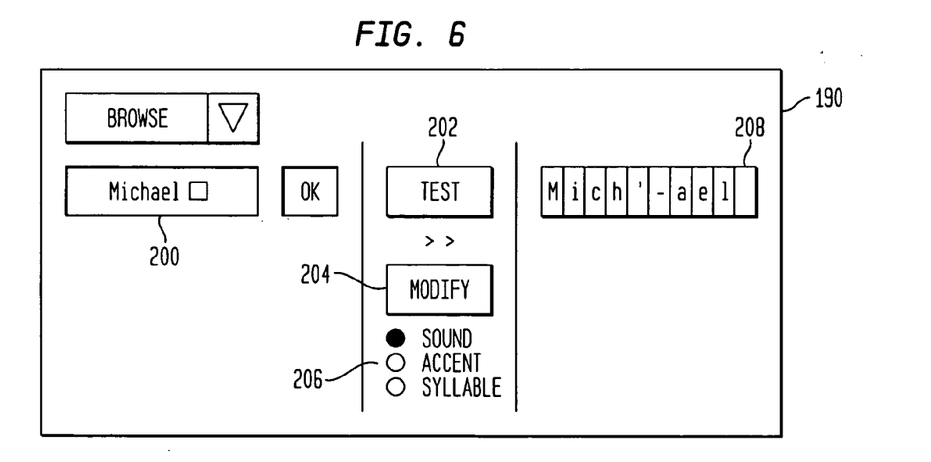

The process implemented by program 26 is described in more detail in FIGS. 3A-3B. An exemplary embodiment of a user interface used during this process is illustrated in FIGS. 5-9. As shown in FIG. 5, interface 190 displayed on display device 18 contains: an input box 200 for manual input of or display of selected characters; a test button 202 which is inactive until a word is selected; a modify button 204 which is similarly inactive until a word is selected; a selection list 206 consisting of the choices "sound", "accent" and "syllable" (or a "grouping"); and a workspace 208.

As explained above, the system 10 preferably contains multiple dictionary and pronunciation databases representing different languages. Referring now to FIG. 3A, a user selects one of the languages, step 70, and the program 26 opens the dictionary for the selected language, step 72. To select a word or other character string, a user can choose to browse the selected dictionary, step 74, in which case the user selects an existing word from the database 76. Otherwise, the user enters a word such as by typing into input box 200, step 78.

Next, the user can choose whether to test the pronunciation of the word, step 80, by selecting test button 202. The process of testing a word pronunciation is described below with reference to FIG. 4.

The user can choose to modify the word's pronunciation, step 82, by selecting modify button 204. If not, the user can store the word and current pronunciation by selecting the "OK" button in dialog 190, step 84. If the word is not an existing word in the dictionary database 28, step 86, the word and pronunciation data are stored in the dictionary, step 88. As explained below with reference to FIG. 4, the pronunciation data for an unmodified word is generated using default pronunciations based on the rules of the selected language. If the word already exists, the new pronunciation data is stored with the word in the dictionary, step 90, and alternate pronunciations may be referred to from contextual circumstances.

If the user wishes to modify the pronunciation, the three choices in selection list 206 are available.

The selected word, now appearing in input box 200, is broken into individual characters and copied into workspace 208. See FIG. 6. Workspace 208 further shows syllable breaks (the dash in workspace 208) and accent marks (the apostrophes in workspace 208) for the current pronunciation.

Figure 7:
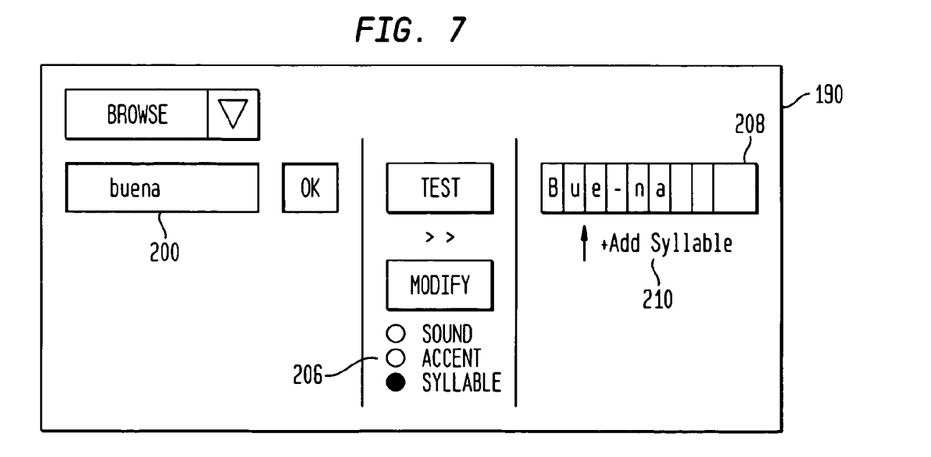

If the user selects to modify the syllable break, step 92, a breakpoint symbol 210 is displayed, see FIG. 7. The symbol 210 may be moved by the user to identify a desired syllable breakpoint, step 94. The program 26 breaks any existing syllable to two syllables at a selected breakpoint, step 96.

Figure 8:
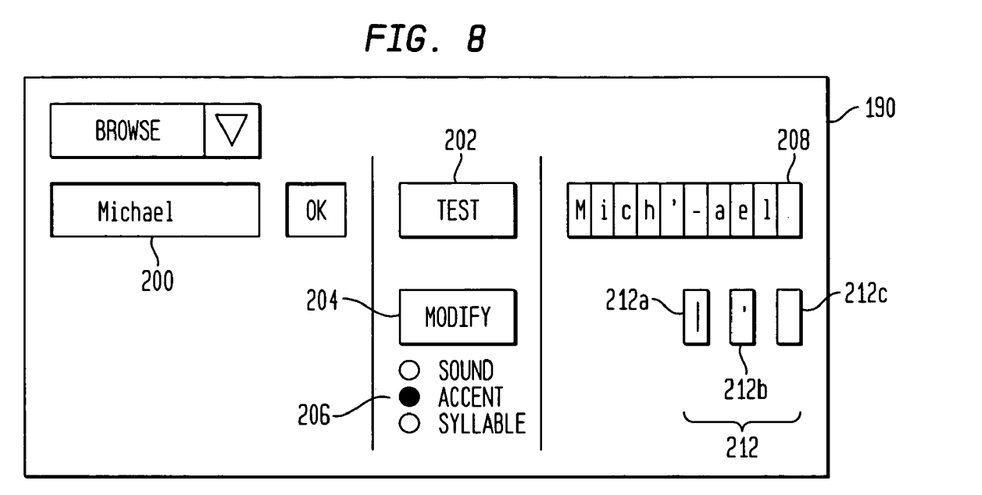

If the user selects to modify the accent, step 98, an accent type selection icon group 212 is displayed in interface 190 (see FIG. 8). The group 212 contains three icons: a primary accent (or major stress) icon 212a, a secondary accent (or minor stress) icon 212b, and a no accent (or unstressed) icon 212c. The user selects an accent level by clicking one of the icons, step 100. The user then selects a syllable, step 102, by, for example, selecting a box in workspace 208 immediately following the syllable. The program 26 identifies the selected syllable with the selected accent level, step 104, and may further adjust the remaining accents in accordance with rules of the selected language. For example, if the language provides for any one primary accented syllable, and the user selects a second syllable for a primary accent, the program may change the first primary accent to a secondary accent, or may delete all remaining accents entirely.

Figure 9:
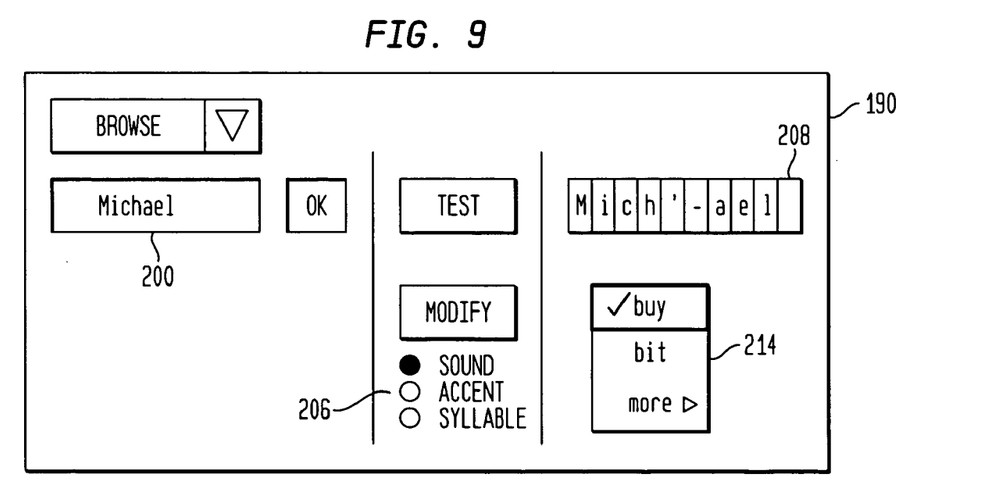

Referring now to FIG. 3B, if the user selects to modify a letter sound in list 206, step 106, the user selects one or more letters in workspace 208, step 108. The program 26 retrieves the sample words from the pronunciation database 30 for the selected language whose pronunciations, or portions thereof, are associated or linked with the selected letter(s), step 110. The words are displayed in word list 214, see FIG. 9. The sample word which represents the default pronunciation for the selected letter(s) is highlighted, step 112. See FIG. 9, in which the sample word "buy" is highlighted in word list 214 for pronunciation of the selected letter "i". A user can also listen to the pronunciations of the sample words. As also shown in FIG. 9, only two or three of the sample words may be shown in word list 214, with an option for the user to see and hear additional words.

If the user selects one of the sample words, step 114, the pronunciation data, or portions thereof, for the selected word is associated with the letter(s) selected in the selected word contained in workspace 208, step 116. The modified word may then be modified further or stored, in accordance with the process described above, or may be tested as described below.

In accordance with certain aspects of the present invention, it is recognized that most languages including English contain words taken from other languages. Therefore, the user is given (e.g., in word list 214 after selecting "more") the option of selecting a pronunciation for the selected letters from another language, step 118. The user then selects the desired language, step 120, and the program 26 retrieves sample words associated with the selected letter(s) from the pronunciation database file 30 for that selected language, step 122. The sample words are then presented for the user's selection as explained above.

As a result, a simple and flexible process is achieved for allowing users to modify word pronunciations. As one example of the ease and flexibility of the process, the word "michael" selected in FIG. 9 may be modified from the English pronunciation, "MiK'-el" to a Hebrew name "Mee-cha'-el" by adding a syllable break between the "a" and "e" and "i" and "ch", placing the primary accent on the new syllable "cha," and selecting appropriate pronunciations for the "i", "ch" (e.g., from the Hebrew language dictionary), "a" and "e" based on common words. No grammatical or linguistic expertise is required.

Figure 4:
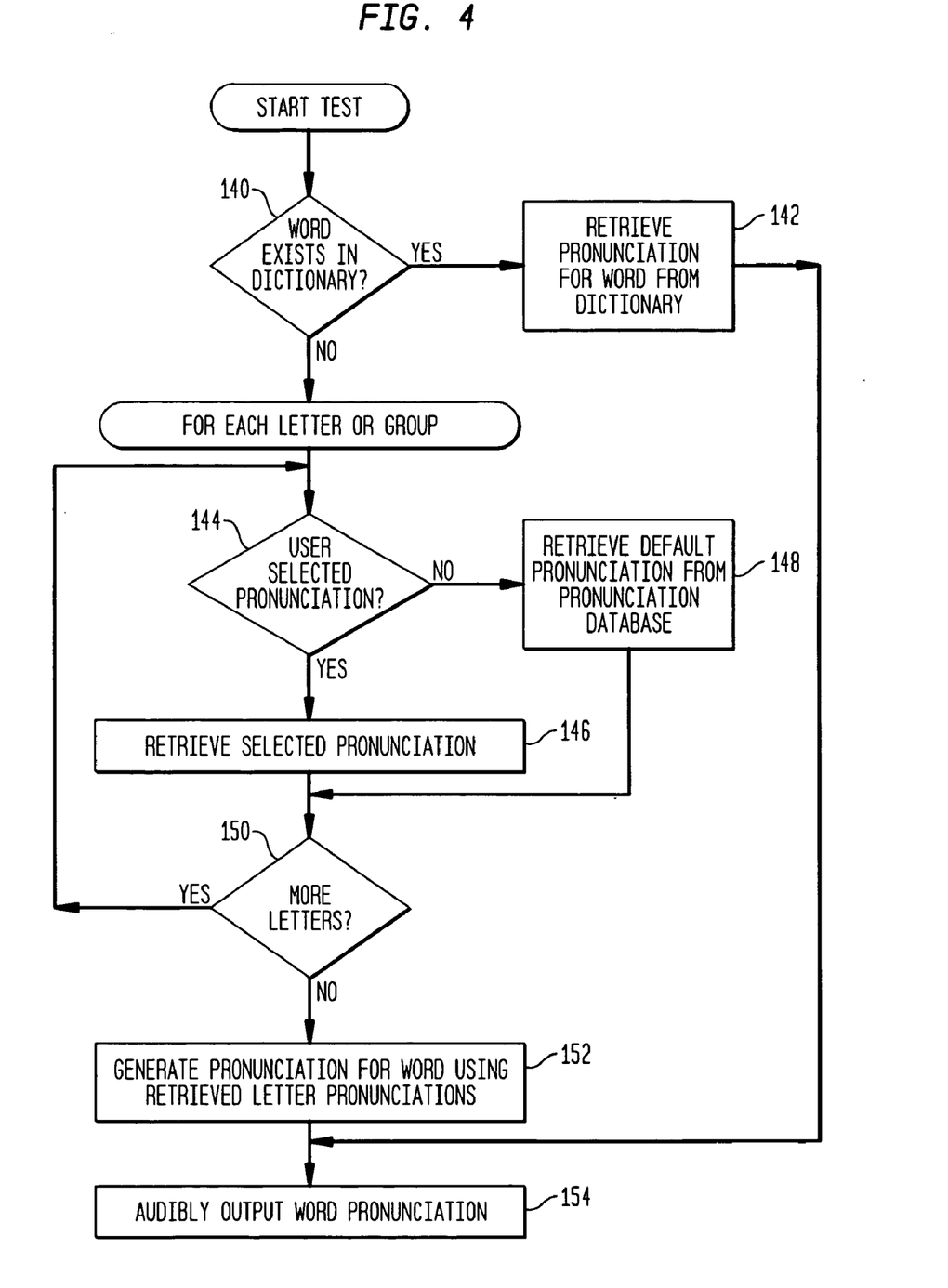
FIG. 4 is a flow chart showing a process of testing the pronunciation of a word.

The process of testing a word's pronunciation is shown in FIG. 4. If the word already is contained in the dictionary database 28, step 140, the stored pronunciation is retrieved, step 142. If more than one pronunciation exists for the word, the user may be prompted to select one, or a default used. If the word is not yet present, then for each letter or letter group, if a user has selected a pronunciation using the program 26, step 144, that pronunciation data is retrieved, step 146, and otherwise a default pronunciation may be selected, step 148. When all letters have been reviewed, step 150, the program 26 generates a pronunciation for the word using the retrieved letter pronunciations, step 152. Finally the TTS module outputs an audible representation of the retrieved or generated word pronunciation, step 154.

Because the system described herein allows for multiple pronunciations for a single word, the TTS module must identify which pronunciation is intended for the word. The TTS module can identify the pronunciation based on the context in which the word is used. For example, the pronunciations may be associated with objects such as users on a network, such that a message intended for a specific user would result in a correct selection of pronunciations. As another example, the TTS module may identify a word usage as noun vs. verb, and select the appropriate pronunciation accordingly.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method implemented on a computer for allowing a user to set a pronunciation of a string of characters, the method comprising:

storing in a memory device pronunciation data for a plurality of strings of characters to be used by a computing system for pronouncing the strings of characters;

receiving via a user interface a selection by a user of a set of one or more characters in a particular one of the strings of characters;

retrieving from a database accessible by the computer a plurality of sample words representing different possible pronunciations of the selected character set and displaying the retrieved samples;

receiving via a user interface a selection by a user of one of the displayed sample words; and updating the pronunciation data in said memory device corresponding to the particular string of characters in accordance with a pronunciation of the selected character set in the sample word selected by the user.

2. The method of claim 1, further comprising allowing the user to identify a part of the character string as a separate syllable, and wherein the step of updating the pronunciation data comprises updating data representing the identified separate syllable.

3. The method of claim 1, further comprising allowing the user to identify a part of the character string to associate with an accent, and wherein the step of updating the first pronunciation data comprises updating data representing the identified accent.

4. The method of claim 1, wherein the character string is received as input from the user.

5. The method of claim 1, wherein the character string is selected by the user from a dictionary database accessible to the computer.

6. The method of claim 1 further comprising generating a pronunciation of the character string using the pronunciation represented by the sample word selected by the user as the pronunciation for the selected character set, and audibly outputting the generated pronunciation.

7. The method of claim 6, further comprising allowing the user to select another of the displayed sample words after audibly outputting the generated pronunciation.

8. The method of claim 1, further comprising allowing the user to select a preferred language and wherein the step of retrieving the sample words representing possible pronunciations of the selected character set comprises selecting a database for the preferred language from a plurality of language databases and retrieving the sample words from the selected database.

9. The method of claim 8, further comprising allowing the user to select a second language for the selected character set and retrieving additional sample words from a second database corresponding to the selected second language.

10. The method of claim 1, further comprising allowing the user to select a second of the displayed sample words and storing second pronunciation data comprising the string of characters with the selected character set being assigned the pronunciation represented by the second sample word selected by the user.

11. The method of claim 10, further comprising, during a text-to-speech process of generating audible output of a text file containing the string of characters, selecting one of the first and second pronunciation data.

12. The method of claim 11, further comprising associating the first and second pronunciation data with first and second objects, respectively, and selecting one of the first and second objects, and wherein the step of selecting one of the first and second pronunciation data comprises selecting the pronunciation data associated with the selected object.

13. The method of claim 10, further comprising, during a speech recognition process, recognizing a pronunciation of the string of characters by a user and selecting one of the first and second pronunciation data which most closely matches the recognized pronunciation.

14. The method of claim 13, further comprising associating the first and second pronunciation data with first and second objects, respectively, and selecting one of the first and second objects which is associated with the selected pronunciation data.

15. An article of manufacture comprising a computer readable medium storing program code for, when executed, causing a computer to perform a graphical user interface method for allowing a user to set a pronunciation of a string of characters, the article of manufacture comprising:
   program code for storing in a memory device pronunciation data for a plurality of strings of characters to be used by a computing system for pronouncing the strings of characters;
   program code for receiving via a user interface a selection by a user of a set of one or more characters in a particular one of the strings of characters;
   retrieving from a database accessible by the computer a plurality of sample words representing different possible pronunciations of the selected character set and displaying the retrieved sample words;
   program code for receiving via a user interface a selection by a user of one of the displayed sample words; and
   updating the pronunciation data in said memory device corresponding to the particular string of characters in accordance with a pronunciation of the selected character set in the sample word selected by the user.

16. The article of claim 15, wherein the program code further causes the computer to generate a pronunciation of the character string using the pronunciation represented by the sample word selected by the user as the pronunciation for the selected character set, and audibly output the generated pronunciation.

17. The article of claim 16, wherein the program code further causes the computer to allow the user to select another of the displayed sample words after audibly outputting the generated pronunciation.

18. The article of claim 15, wherein the program code further causes the computer to allow the user to select a second of the displayed sample words and storing second pronunciation data comprising the string of characters with the selected character set being assigned the pronunciation represented by the second sample word selected by the user.

19. The article of claim 18, wherein the program code further causes the computer, during a text-to-speech process of generating audible output of a text file containing the string of characters, to select one of the first and second pronunciation data.

20. The article of claim 19, wherein the program code further causes the computer to associate the first and second pronunciation data with first and second objects, respectively, and select one of the first and second objects, and wherein the step of selecting one of the first and second pronunciation data comprises selecting the pronunciation data associated with the selected object.

21. The article of claim 18, wherein the program code further causes the computer, during a speech recognition process, to recognize a pronunciation of the string of characters by a user and select one of the first and second pronunciation data which most closely matches the recognized pronunciation.

22. The article of claim 21, wherein the program code further causes the computer to associate the first and second pronunciation files with first and second objects, respectively, and select one of the first and second objects which is associated with the selected pronunciation record.

23. A graphical user interface system for allowing a user to modify a pronunciation of a string of characters, the system comprising:
   a dictionary database stored on a memory device comprising a plurality of first character strings and associated pronunciation records;
   a pronunciation database stored on a memory device comprising a plurality of second character strings each comprising one or more characters and each associated with a plurality of words, each word having one or more characters which are pronounced in the word in substantially identical fashion to one manner in which the associated second character string may be pronounced;
   an input/output system for allowing a user to select one of the first character strings from the dictionary database, to select a set of one or more characters from the selected string, and to select one of the words in the pronunciation database; and
   a programmable controller for updating said dictionary database to reflect a pronunciation of the selected first string of characters in accordance with a pronunciation of the selected character set in the selected one of the words.

* * * * *